United States Patent
Pandya

(10) Patent No.: US 11,201,769 B2
(45) Date of Patent: Dec. 14, 2021

(54) ALL DIGITAL NON-CONVENTIONAL CHAOTIC COMMUNICATION SYSTEMS FOR RESILIENT COMMUNICATIONS AND SIGNALING

(71) Applicant: NORTHROP GRUMMAN SYSTEMS CORPORATION, Falls Church, VA (US)

(72) Inventor: Ameesh N. Pandya, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 46 days.

(21) Appl. No.: 16/851,552

(22) Filed: Apr. 17, 2020

(65) Prior Publication Data
US 2021/0328840 A1   Oct. 21, 2021

(51) Int. Cl.
  *H04L 27/00* (2006.01)
  *H04B 1/707* (2011.01)
  (Continued)

(52) U.S. Cl.
  CPC ........... *H04L 27/001* (2013.01); *H04B 1/707* (2013.01); *H04L 1/0071* (2013.01);
  (Continued)

(58) Field of Classification Search
  CPC .............. H04L 27/001; H04L 27/0008; H04L 27/3405; H04L 27/3488; H04L 1/0071; H04B 1/707
  See application file for complete search history.

(56) References Cited

U.S. PATENT DOCUMENTS

| 6,430,209 B1 | 8/2002 | Shigyo et al. |
| 8,351,484 B2* | 1/2013 | Michaels ................. G09C 1/00 375/141 |

(Continued)

OTHER PUBLICATIONS

Netto, Fabio Siqueira.; Eisencraft, Marcio. Spread Spectrum Digital Communication System Using Chaotic Pattern Generator. The 10th Experimental Chaos Conference—ECC10 Jun. 3-6, 2008, pp. 1-6 Catania, Italy.
Michaels, Alan J. Digital Chaotic Communications. A Dissertation Presented to The Academic Faculty, Jul. 1, 2009. pp. 1-208 Georgia Institute of Technology.

(Continued)

*Primary Examiner* — Vineeta S Panwalkar
(74) *Attorney, Agent, or Firm* — John A. Miller; Shumaker, Loop & Kendrick, LLP

(57) ABSTRACT

An all-digital spread-spectrum type communications system employing chaotic symbol modulation. The system includes a transmitter having a symbol mapper that converts a series of information bits to a series of bit symbols, a digital chaos modulator employing an M-ary chaotic shift keying (M-CSK) architecture for chaotically spreading the bit symbols in the digital domain, where the chaos modulator includes a separate chaos generator for each of the M-CSK symbols, and a digital-to-analog converter (DAC) for converting the chaotic modulated bit symbols to an analog signal for transmission. The system also includes a receiver responsive to the analog signal from the transmitter and generating a received signal therefrom. The receiver performs signal acquisition and tracking on the received signal using a look-up table, a transmitter ID and a receiver ID in the received signal, de-spreading and de-modulation on the received signal and bit removal from the symbols in the received signal.

20 Claims, 4 Drawing Sheets

(51) Int. Cl.
*H04L 27/34* (2006.01)
*H04L 1/00* (2006.01)

(52) U.S. Cl.
CPC ...... *H04L 27/0008* (2013.01); *H04L 27/3405* (2013.01); *H04L 27/3488* (2013.01)

(56) References Cited

U.S. PATENT DOCUMENTS

| | | | |
|---|---|---|---|
| 8,385,385 B2 | 2/2013 | Michaels et al. | |
| 8,406,352 B2 | 3/2013 | Michaels et al. | |
| 2010/0098191 A1* | 4/2010 | Morris | H03D 7/161 |
| | | | 375/322 |
| 2013/0223755 A1* | 8/2013 | Wyville | G06K 9/0051 |
| | | | 382/260 |
| 2017/0033833 A1 | 2/2017 | Terry | |
| 2017/0163296 A1* | 6/2017 | Terry | H04B 7/0413 |

OTHER PUBLICATIONS

Riaz, Anjam; Ali, Maaruf. Chaotic Communications, their Applications and Advantages over Traditional Methods of Communication. 2008. pp. 21-24. Oxford Brookes University, Department of Electronics & Computing, Wheatley Campus, Oxfordshire, UK.

Michaels, Alan J.; Chester, David B. Efficient and Flexible Chaotic Communication Waveform Family. The 2010 Military Communications Conference—Unclassified Program—Waveforms and Signal Processing Track. 2010. pp. 353-358.

Michaels, Alan J.; Chester, David B. Featureless Chaotic Spread Spectrum Modulation of Arbitrary Data Constellations. 2011 IEEE 12th International Workshop on Signal Processing Advances in Wireless Communications. Harris Corporation, Government Communication Systems, pp. 36-40.

PCT International Search Report of the International Searching Authority dated Mar. 4, 2021 for International Application No. PCT/US2020/061925 filed Nov. 24, 2020.

* cited by examiner

ALL DIGITAL NON-CONVENTIONAL CHAOTIC COMMUNICATION SYSTEMS FOR RESILIENT COMMUNICATIONS AND SIGNALING

BACKGROUND

Field

This disclosure relates generally to a variant of spread-spectrum communications system employing chaotic modulation and coding and, more particularly, to an all-digital spread-spectrum communications system implementation employing digital chaotic symbol modulation and coding, and including a transmitter having a digital chaos modulator having a chaos generator for each symbol.

Discussion of the Related Art

Digital communications systems typically map or translate a stream of encoded information bits to be transmitted into a constellation of symbols, where each symbol defines a group of the bits. For example, a bit mapper may employ M-ary phase shift keying (M-PSK) that provides in-phase and quadrature-phase bits for each symbol that is transmitted. The mapped symbols are then modulated onto a waveform, filtered and converted/up-converted to an analog signal for transmission. When the analog signal is received by a receiver, the signal is converted to a digital signal to remove the carrier and the digital signal is demodulated to recover the bit symbols, which requires knowledge of the time and position of the individual symbols in the signal to correctly determine the value of each symbol. The information bits are then extracted from the bit symbols.

For certain applications, it is desirable to transmit a data or communications signal without the signal being detected by someone else, such as an adversary, i.e., the adversary does not know that a signal is being transmitted, typically for various low probability of interception/low probability of detection (LPI/LPD) communications applications. One approach is to spread the energy of the transmitted signal, which would normally be transmitted over a relatively narrow frequency band, over a wide frequency band or spectrum, known in the art as direct-sequence spread-spectrum processing, so that the signal energy is washed out in the background and is not readily detectable. Conventionally, spread spectrum systems use a pseudo-noise (PN) sequence for spreading information bits in conjunction with traditional modulation techniques, such as M-PSK, M-ary quadrature amplitude modulation (M-QAM), etc., for the purposes of transmission. Although these techniques do bury the signal below the noise floor, they cannot hide the features that adversaries can detect. A sub-approach for spread-spectrum processing includes spreading the signal with a chaotic sequence to spread out the energy of the transmitted waveform. The modulation techniques employed for the chaotic spread signal is typically conventional modulation and coding, such as M-PSK, M-QAM, etc., which allows a straightforward synchronization between the modulated bits transmitted by the transmitter and the bits received by the receiver using conventional demodulation and decoding. However, employing conventional modulation and coding techniques in a digital communications system reduces the effectiveness of a chaotic spreading of the transmitted signal. Therefore, benefits can be obtained by providing all chaotic spreading and modulation of the information signal in these types of communications systems.

DETAILED DESCRIPTION OF THE EMBODIMENTS

The following discussion of the embodiments of the disclosure directed to an all-digital communications system employing chaotic spreading, modulation and coding is merely exemplary in nature, and is in no way intended to limit the disclosure or its applications or uses.

Figure 1:
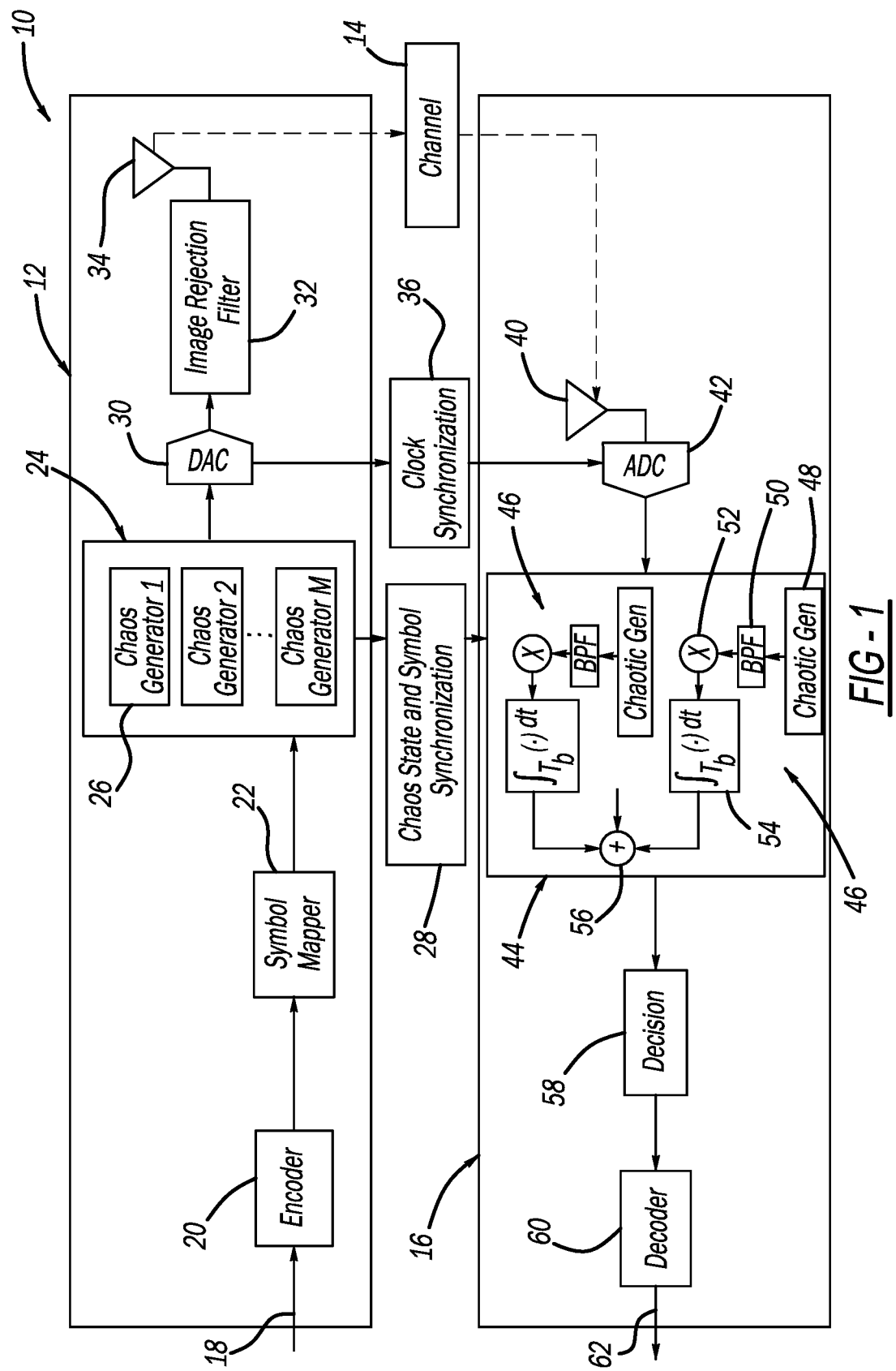
FIG. 1 is a schematic block diagram of an all-digital spread-spectrum communications system employing chaotic modulation and coding, and including a transmitter having a chaos modulator with a chaos generator for each symbol and a receiver that employs correlators to recover the transmitted chaotic signal.

FIG. 1 is a schematic block diagram of an all-digital chaos communications system 10 that includes a transmitter 12 that transmits an encoded data and/or information signal over a communications channel 14, such as a wireless communications channel, that is received by a receiver 16. The communications system 10 is intended to be used for any application that can benefit from spread-spectrum signal processing. The transmitter 12 includes an encoder 20, such as a forward error correction (FEC) encoder that provides a channel coding scheme, such as convolutional coding, Reed-Solomon coding, low-density parity-check (LDPC) coding, turbo coding, etc., to add redundant bits to the information bits provided on line 18 to be transmitted for error correction purposes and provides a stream of encoded information bits. The encoded information bits are sent to symbol mapper 22 that translates the bits into a constellation of bit symbols, such as two-bits per symbol, four-bits per symbol, etc., in a manner well understood by those skilled in the art.

The symbols are then modulated by a digital chaos modulator 24 that may employ, for example, an M-ary chaotic shift keying (M-CSK) architecture, to represent the symbols as a chaotic sequence of values that spreads the energy of the symbols across a wider spectrum to be below the noise floor, where m-bits per symbol mapping corresponds to the M-CSK, and where $M=2^m$ represents the number of symbols. In this embodiment, the modulator 24 employs a separate chaos generator 26 for each of the M symbols. For example, mapping two-bits per symbol provides modulation as 4-CSK and employs four of the chaos generators 26. Each of the chaos generators 26 generates a unique symbol, for example, for 4-CSK, the symbol 00 is provided by one of the chaos generators 26, the symbol 01 is provided by another one of the chaos generators 26, the symbol 10 is provided by another one of the chaos generators 26, and the symbol 11 is provided by another one of the chaos generators 26. The selected chaos spreading factor that determines how much the symbols are spread out, i.e., the number of chips or samples per symbol, for the generators 26 sets how many chaos (spreading) bits are used to represent a symbol. Specifically, for a spreading factor of length L, a symbol is represented by L number of chaos bits or samples. For example, for a spreading factor of length 512, each symbol is represented by 512 chaos bits or samples. The next time a symbol is repeated, the generator 26 starts with chaos bit $(r-1) \cdot L+1$, where r is the symbol repetition number. If a symbol is being represented for the first time, then the generator 26 starts with chaos bit or sample 1, if the symbol is represented a second time, then the generator 26 starts with chaos bit or sample L+1, etc. The chaotic sequences are selected in such a manner that they will never repeat for a given application. The chaos bits or samples are arranged in frames and padded with preamble bits and a synchronization function that aids the receiver 16 to determine the chaos state used for the transmission and hence, helping with symbol synchronization for recovery of the transmitted data. Since the synchronization period is smaller, traditional synchronization techniques can also be employed, if desired, with the low risk of being detected. A selector (see FIG. 2) selects which of the symbols that has been spread out by the modulation process is output from the modulator 24 at any particular point in time.

The chaotic modulated symbols are then sent to a digital-to-analog converter (DAC) 30, such as a high speed interpolating DAC or delta-sigma DAC, that modulates the digital signals onto an analog waveform and that takes advantage of the available Nyquist zones to establish the offset carrier before transmission. Note that the analog signal can be up-converted to a higher frequency, if desired, but not required with the appropriate choice of DAC and Nyquist zone. The analog signal is then filtered by an image rejection filter 32 that removes replicas generated by the DAC 30 and transmitted by an antenna 34, such as an omni-directional antenna, for example, a whip or dipole antenna, or a directional antenna, for example, an AESA or reflector antenna, onto the channel 14.

The transmitted signal on the channel 14 is received by an appropriate antenna 40 in the receiver 16, down-converted to a lower frequency, if up-converted in the transmitter 12, and then converted to a digital signal by an analog-to-digital (ADC) converter 42 to extract the symbols that were transmitted. The receiver 16 first performs signal acquisition based on a local look-up table and the transmitter ID and then tracking is performed using the receiver ID. A de-spreading and de-modulation operation is performed on the received signal in a correlation processor 44 that includes a number of correlators 46 providing the desired resolution, for example, three or more correlators in parallel for the quick search at the start of the frame. Each correlator 46 receives the digital sequence or samples that are sent to a chaos generator 48, similar to the chaos generators 26, to remove the chaotic sequence. The digital sequence or samples are then filtered by a band-pass filter 50, multiplied by a multiplier 52 and integrated by an integrator 54 in a known manner by the correlation process. The correlated bits from each of the correlators 46 are then added in a summer 56. A soft or hard decision processor 58 removes the bits from the symbols and a decoder 60 removes the redundant bits to provide the information bits on line 62 using known processes from the literature.

As mentioned above, in order for the receiver 16 to be able to extract the transmitted symbols as discussed herein, transmitter and receiver synchronization and data transmission tracking is required using, for example, chaos state and symbol synchronization 28. As will be discussed below, synchronization between the DAC 30 and the ADC 42 and hardware clocks is accomplished by transmitting an acquisition or preamble sync pulse from the transmitter 12 to the receiver 16 to phase lock the DAC 30 and the ADC 42 using, for example, clock synchronization 36. The preamble sync pulse can be generated by a conventional approach such as by using quadrature-phase shift keying (QPSK) for a short period of time, a chaotic approach such as by using a differential chaos shift keying (DCSK) sync pulse for a short period of time or an inverse chaos approach using an RF analog sync pulse. Chaos state synchronization for the chaos generators 26 can be accomplished by transmitting a sync pulse from the transmitter 12 to the receiver 16. For data transmission tracking, the correlation processor 44 can use a threshold detector to determine if a signal exists.

Figure 2:
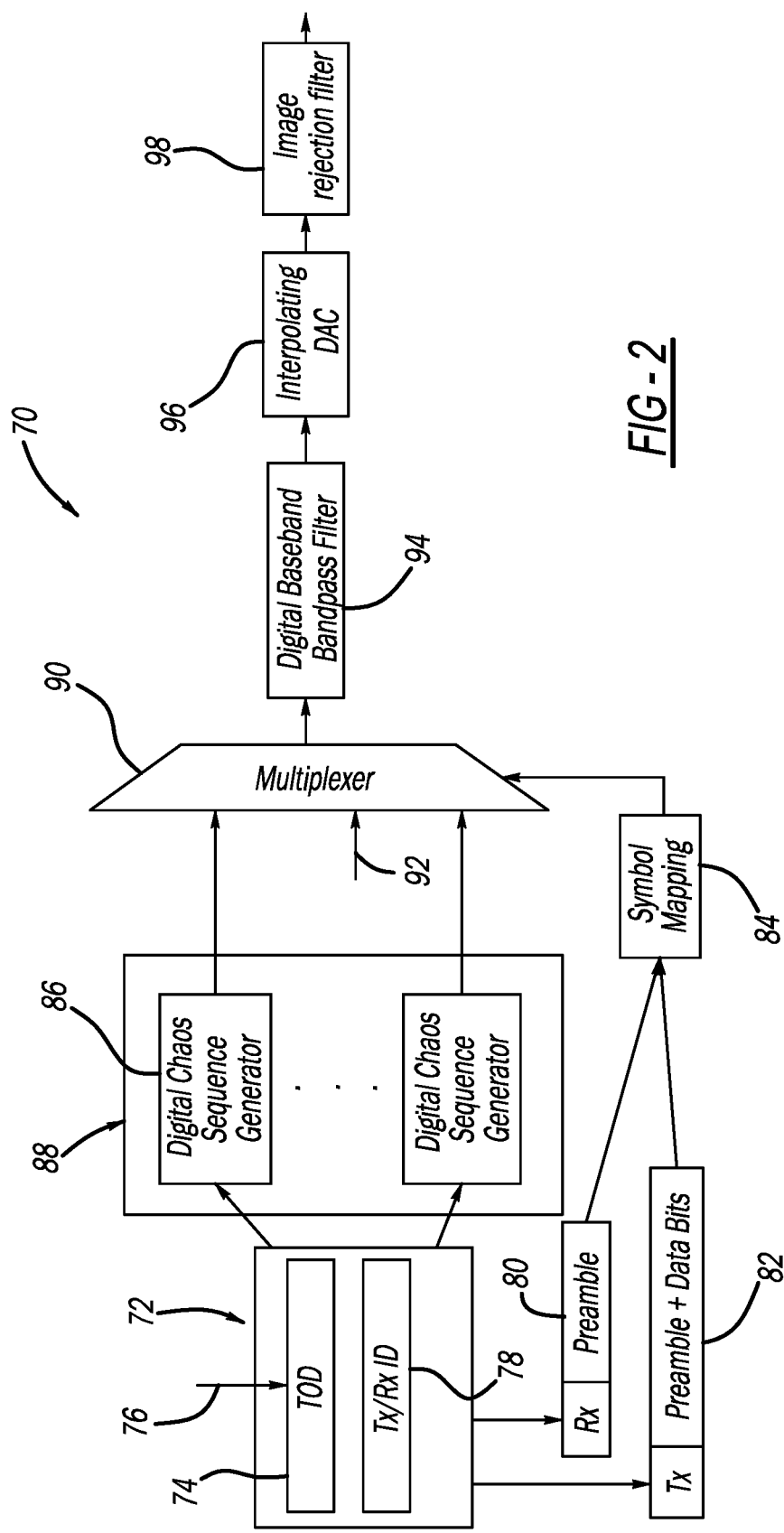
FIG. 2 is a schematic block diagram of a transmitter for a chaos communications system illustrating a preamble and data format for synchronization between the transmitter and the receiver in the communications system shown in FIG. 1.

FIG. 2 is a schematic block diagram of a chaos waveform generation system 70 that shows this type of synchronization and tracking, where the system 70 provides transmitter and receiver ID bits and preamble bits in the transmitted messages. The system 70 includes a synchronization block 72, representing the synchronization 28, that provides a time of day (TOD) signal at block 74 converted from a GPS signal, if available, on line 76 or a local transmitter time or a known constant and transmitter and receiver IDs at block 78 that provide receiver preamble and ID bits shown at block 80 and transmitter ID, preamble and data bits shown at block 82 that are sent to a symbol mapping block 84 representing the symbol mapper 22. The TOD signal and the transmitter and receiver ID bits are also provided to digital chaos sequence generators 86, representing the generators 26, in a chaos state synchronization block 88 that provides a chaotic sequence of bits to a multiplexer 90 along with a clock signal on line 92, where the symbol mapping block 86 selects the output of the multiplexer 90. If desired, the chaotic sequence that is selected by the multiplexer 90 could be filtered by a baseband bandpass filter 94, and then the filtered chaos sequence can be converted to an analog signal by a DAC 96, representing the DAC 30, and filtered by an image rejection filter 98, representing the filter 32. If the baseband bandpass filter 94 is not used, then the chaotic sequence that is selected by the multiplexer 90 is converted to an analog signal by the DAC 96, and filtered by the image rejection filter 98. The combination of a unique chaotic waveform with strong orthogonal properties for every symbol along with per-symbol filtering, if desired, minimizes inter-symbol interference (ISI), and correlating spectrum limited die to bandpass filtering signals mitigates the energy lost due to filtering.

One approach for providing the chaos state and symbol synchronization 28 includes identifying a chaos generator function, such as, $x_{n+1}=f_1(x_n)+a \cdot f_1(x_n)$, that determines the sequence of chaos bits. In order to generate matching pairs in the transmitter 12 and the receiver 16, it is necessary to have the same initial condition $x_0$ and the same appropriately selected bifurcation parameter a, where the parameter a needs to be updated less frequently. Both the initial condition $x_0$ and the bifurcation parameter a are provided by an outcome of the keying function that depends either on the TOD or a known constant in the absence of TOD from the GPS, i.e., a GPS denied environment, and the transmitter and receiver ID and loaded into a look-up table. The chaos initial keys generator function denotes the transmitter ID as $n_x$ and the receiver ID as $n_y$. The initial state keys and the chaos function parameters are generated by function g(•) for a signal acquisition stage $[a, x_0]=g(t_{GPS}, n_y)$ if the GPSaided TOD is available and [a, $x_0$]=g(C, $n_y$) for a non-GPS available state. Tracking during signal transmission is provided by [a, $x_0$]=g($t_x$, $n_x$), which does not require GPS. The resulting sync structure includes the preamble bits, the transmitter ID, the transmitter TOD or a constant in the absence of GPS, and hence TOD, and an end of pulse signal.

Figure 3:
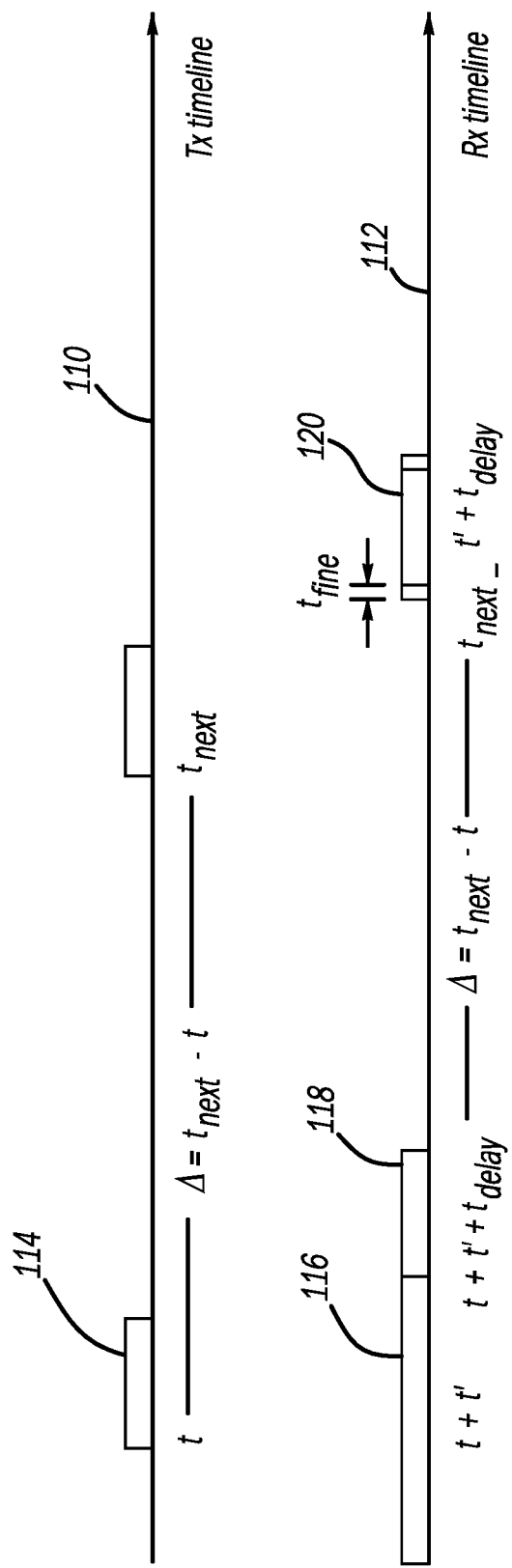
FIG. 3 shows transmitter and receiver pulse timelines illustrating the synchronization between the transmitter and receiver in the communications system shown in FIG. 1.

The above described chaos state synchronization can be illustrated by FIG. 3 showing a transmitter timeline 110 and a receiver timeline 112. The transmitter 12 generates and transmits a sync pulse 114 at time t using the chaos keying function that uses the receiver ID and the TOD signal, where the sync pulse 114 also lets the receiver 16 know the transmitter's TOD. The receiver 16 uses its own ID and TOD to create a correlating pair and listens for the incoming signal at time block 116. The receiver 16 finds the correlation and detects and decodes the sync pulse as pulse 118. The receiver 16 uses the transmitter ID and the transmitters TOD to create a next correlating pair for a data pulse, and the correlation in the receiver 16 is used for demodulation. Tracking may be required for searching data start with a pilot symbol. This is an example of open loop synchronization where there is no handshake between the transmitter 12 and the receiver 16. The initial preamble frame can be repeated multiple times to ensure synchronization. The number of repetitions depends on an operational environment. Alternatively, a closed loop synchronization scheme can be implemented where the receiver 16 sends either an acknowledgement or corresponding frame to the transmitter 12.

The chaos generators 26 generate a chaotic sequence of bits or samples where each of the generators 26 has a different initial seeding that determines the chaotic sequence it generates, and where the next value of one generator 26 is the first value of the next generator 26. The generators 26 only correlate to themselves and look like white noise.

Figure 4:
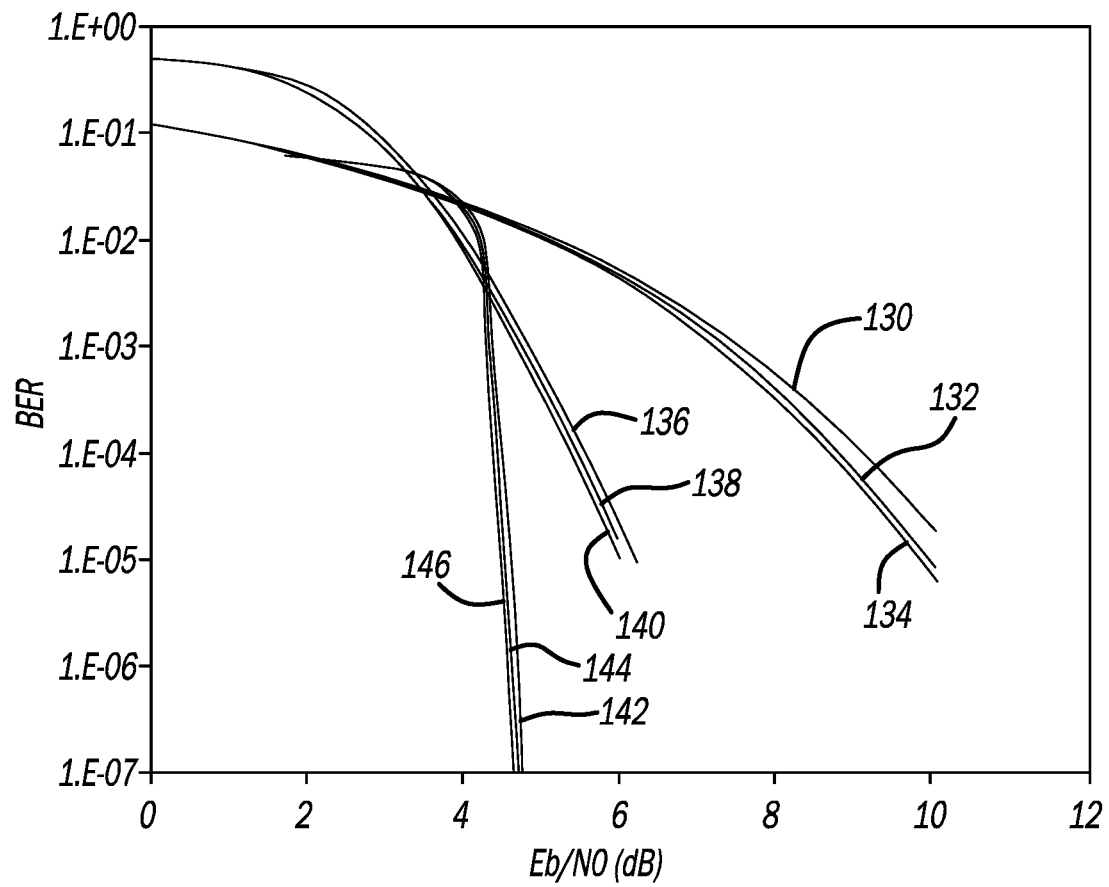
FIG. 4 is a graph with the ratio of energy per bit (Eb) to the spectral noise density (No) on the horizontal axis and bit error rate (BER) on the vertical axis showing a simulation illustrating BER performance of a coded and uncoded 4-CSK chaos system with three spreading factors.

The communications performance of the proposed chaotic communications system will closely follow an M-FSK (frequency shifting key) communications system. The optimal spreading factor for a given application can be derived through simulation. For example, FIG. 4 is graph with the ratio of energy per bit (Eb) to the spectral noise density (No) in dB on the horizontal axis and BER on the vertical axis showing a simulation illustrating that the uncoded BER performance of a 4-CSK system is close to optimal with a spreading factor (SF) of 512, where graph line 130 is for a 4-CSK system with a SF of 64, graph line 132 is for a 4-CSK system with an SF of 512, graph line 134 is for a 4-CSK system with an SF of 32768, graph line 136 is for a 4-CSK system with an SF of 64 and a rate ½ convolutional code (CC), graph line 138 is for a 4-CSK system with an SF of 512 and a rate ½ CC, graph line 140 is for a 4-CSK system with an SF of 32768 and a rate ½ CC, graph line 142 is for a 4-CSK system with an SF of 64 and a rate ½ CC with a Reed Solomon (RS) code 255,171 giving an overall rate of ⅓, graph line 144 is for a 4-CSK system with an SF of 512 and a rate ½ CC with a RS code 255,171 giving an overall rate=⅓, and graph line 146 is for a 4-CSK system with an SF of 32768 and a rate ½ CC with a RS code 255,171 giving an overall rate of 1/3. The coding gain between the graph lines 132 and 138 is ~3.7 dB at $10^{-5}$ BER and the coding gain between the graph lines 132 and 144 is ~5.2 dB at $10^{-5}$ BER. Any increase in the spreading factor beyond 512 does not provide any noticeable performance benefits. Also, the encoding of information bits with either convolutional or combined convolution-Reed Solomon code can enhance the BER performance.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A communications system comprising:
   a transmitter including a symbol mapper that converts a series of information bits to a series of bit symbols, a digital chaos modulator providing chaotic spreading modulation of the bit symbols in the digital domain, and a digital-to-analog converter (DAC) for converting the chaotic modulated bit symbols to an analog signal for transmission; and
   a receiver responsive to the analog signal from the transmitter and generating a received signal therefrom, said receiver performing signal acquisition and tracking of the received signal, de-spreading and de-modulation of the received signal and bit removal from the symbols in the received signal, wherein the receiver performs the signal acquisition using a look-up table and a transmitter identification (ID) in the received signal and performs the tracking using a receiver ID in the received signal.

2. The system according to claim 1 wherein the chaos modulator employs an M-ary chaotic shift keying (M-CSK) architecture without combining with any other conventional communications.

3. The system according to claim 2 wherein the chaos modulator includes a separate chaos generator for each of the M-CSK symbols.

4. The system according to claim 3 wherein each of the generators has a different initial seeding that determines the chaotic sequence it generates, where a next value of one generator is a first value of a next generator.

5. The system according to claim 2 wherein the M-CSK architecture is 4-CSK.

6. The system according to claim 1 further comprising hardware for providing synchronization between hardware clocks in the transmitter and the receiver by transmitting an acquisition or preamble sync pulse in the transmitted analog signal.

7. The system according to claim 6 wherein the preamble sync pulse includes chaos state synchronization for the chaos modulator.

8. The system according to claim 7 wherein the chaos state synchronization uses a chaos generator function that determines a sequence of chaos bits used by the chaos modulator, where the chaos generator function uses an initial condition and a constant parameter vector.

9. The system according to claim 8 wherein the preamble sync pulse includes the transmitter ID and the receiver ID that are used by the chaos state synchronization.

10. The system according to claim 8 wherein the preamble sync pulse includes time of day (TOD) information from a global positioning system (GPS) signal or a known value in absence of GPS that are used by the chaos state synchronization.

11. The system according to claim 6 wherein the transmitter generates the preamble sync pulse using a traditional modulation scheme, such as quadrature-phase shift keying (QPSK) for a short period of time, or a chaotic approach using either a differential chaotic shift keying (DCSK) sync pulse for a short period of time or an inverse chaos approach using a radio frequency analog sync pulse.

12. A communications system comprising:
- a transmitter including a symbol mapper that converts a series of information bits to a series of bit symbols, a digital chaos modulator employing an M-ary chaotic shift keying (M-CSK) architecture for chaotically spreading the bit symbols in the digital domain, said chaos modulator including a separate chaos generator for each of the M-CSK symbols, and a digital-to-analog converter (DAC) for converting the chaotic modulated bit symbols to an analog signal for transmission; and
- a receiver responsive to the analog signal from the transmitter and generating a received signal therefrom, said receiver performing signal acquisition on the received signal using a look-up table and a transmitter identification (ID) in the received signal, signal tracking using a receiver ID in the received signal, de-spreading and de-modulation on the received signal and bit removal from the symbols in the received signal.

13. The system according to claim 12 further comprising hardware for providing synchronization between hardware clocks in the transmitter and the receiver by transmitting an acquisition or preamble sync pulse in the transmitted analog signal.

14. The system according to claim 13 wherein the preamble sync pulse includes chaos state synchronization for the chaos generators.

15. The system according to claim 14 wherein the chaos state synchronization uses a chaos generator function that determines a sequence of chaos bits used by the chaos modulator, where the chaos generator function uses an initial condition and a constant parameter vector.

16. The system according to claim 15 wherein the preamble sync pulse includes the transmitter ID and the receiver ID that are used by the chaos state synchronization.

17. The system according to claim 16 wherein the preamble sync pulse includes time of day (TOD) information from a global positioning system (GPS) signal or a known value that are used by the chaos state synchronization.

18. A method for communications comprising:
- converting a series of information bits to a series of bit symbols;
- providing a chaotic spreading modulation of the bit symbols in the digital domain that employs an M-ary chaotic shift keying (M-CSK) architecture;
- converting the chaotic modulated bit symbols to an analog signal for transmission;
- performing signal acquisition and tracking of the analog signal in a receiver; and
- performing de-spreading and de-modulation of the received signal in the receiver and bit removal from the symbols in the received signal.

19. A communications system comprising:
- a transmitter including a symbol mapper that converts a series of information bits to a series of bit symbols, a digital chaos modulator providing chaotic spreading modulation of the bit symbols in the digital domain, and a digital-to-analog converter (DAC) for converting the chaotic modulated bit symbols to an analog signal for transmission, wherein the chaos modulator employs an M-ary chaotic shift keying (M-CSK) architecture without combining with any other conventional communications; and
- a receiver responsive to the analog signal from the transmitter and generating a received signal therefrom, said receiver performing signal acquisition and tracking of the received signal, de-spreading and de-modulation of the received signal and bit removal from the symbols in the received signal.

20. A communications system comprising:
- a transmitter including a symbol mapper that converts a series of information bits to a series of bit symbols, a digital chaos modulator providing chaotic spreading modulation of the bit symbols in the digital domain, and a digital-to-analog converter (DAC) for converting the chaotic modulated bit symbols to an analog signal for transmission;
- a receiver responsive to the analog signal from the transmitter and generating a received signal therefrom, said receiver performing signal acquisition and tracking of the received signal, de-spreading and de-modulation of the received signal and bit removal from the symbols in the received signal; and
- hardware for providing synchronization between hardware clocks in the transmitter and the receiver by transmitting an acquisition or preamble sync pulse in the transmitted analog signal, wherein the preamble sync pulse includes chaos state synchronization for the chaos modulator, and wherein the chaos state synchronization uses a chaos generator function that determines a sequence of chaos bits used by the chaos modulator, where the chaos generator function uses an initial condition and a constant parameter vector.

* * * * *